United States Patent [19]

Mohan

[11] Patent Number: 4,917,938
[45] Date of Patent: Apr. 17, 1990

[54] FIBER REINFORCED ARTICLE CAPABLE OF REVEALING DAMAGE DUE TO SURFACE IMPACTS AND METHOD OF MAKING SAME

[75] Inventor: Raja Mohan, Dublin, Ohio
[73] Assignee: Edo Corporation, Salt Lake City, Utah
[21] Appl. No.: 14,391
[22] Filed: Feb. 13, 1987
[51] Int. Cl.⁴ ............................................. B32B 7/02
[52] U.S. Cl. ................................... 428/215; 422/105; 422/114; 422/212; 422/213; 422/285; 422/408; 422/902
[58] Field of Search ................. 428/32, 377, 378, 391, 428/448, 911, 902, 408, 213, 215, 285, 105, 114, 212

[56] References Cited

U.S. PATENT DOCUMENTS

| | | | |
|---|---|---|---|
| Re. 31,047 | 10/1982 | Ross | 428/36.3 |
| 4,035,550 | 7/1977 | Suh et al. | 428/391 |
| 4,043,703 | 8/1977 | Carlson | 428/114 |
| 4,373,555 | 2/1983 | Mattuck et al. | 428/36.3 |
| 4,617,213 | 10/1986 | Asano et al. | 428/36.3 |
| 4,677,020 | 6/1987 | Takagi et al. | 428/377 |

Primary Examiner—James J. Bell
Attorney, Agent, or Firm—Thorpe, North & Western

[57] ABSTRACT

A structure and a method of producing such structure which includes a fiber reinforced composite article in which the surface of the article will generate a visible indication thereon upon impact of the surface by another object. The method comprises laying up multiple layers of a first material into the shape of the desired composite article. A relatively thin layer of a second filamentary material is then layed up on and bonded to the surface of the base structure formed by the layers of the first material. The second filamentary material forms a thin outer layer on the composite article, and upon impact of the outer layer with another object, the outer layer delaminates and forms a discoloration in the form of a whitened patch or spot in the immediate vicinity of the impact. The articles so produced can be visually inspected for damage, and only those articles showing a surface discoloration need be subjected to nondestructive testing. Further, only the portion of the article in the vicinity of the discoloration need to tested.

6 Claims, 1 Drawing Sheet

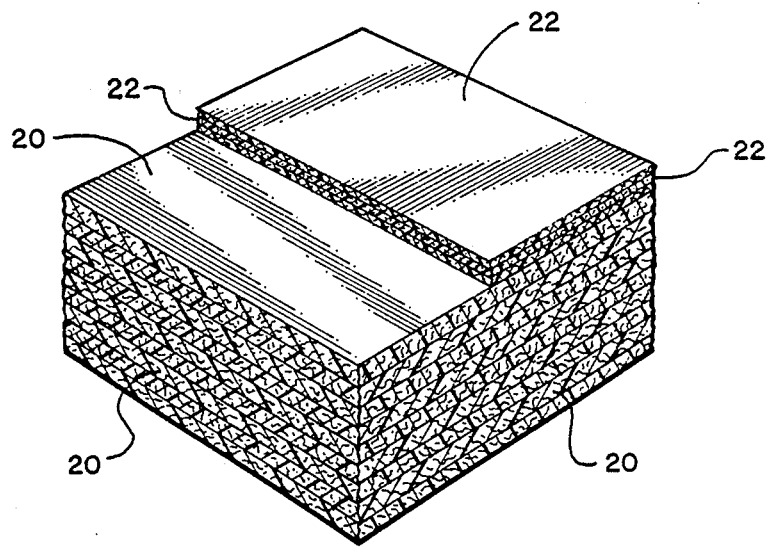

ed undamaged surface. Thus, the area of impact on the surface is visibly indicated by a whitened area on the outer layer of the composite structure.

FIBER REINFORCED ARTICLE CAPABLE OF REVEALING DAMAGE DUE TO SURFACE IMPACTS AND METHOD OF MAKING SAME

BACKGROUND OF THE INVENTION

1. Field of the Invention

The present invention relates to a novel structure and method of producing a fiber reinforced composite article in which the surface of the article will generate a visible indication thereon upon impact of the surface by a foreign object.

2. State of the Art

The advantages of making high strength, relatively lightweight articles from fiber reinforced composites is well known in the prior art. Generally, the articles made of composite fiber reinforced materials are high in strength, and yet have a relatively low weight. Such articles as high strength tanks, vessels and structural members including drive shafts, aircraft structural members and other items are advantageously made of composite fiber reinforced materials.

Various procedures and apparatus have been developed for producing articles with multiple layers of filamentary material. Methods of fabricating high strength articles include winding of reinforcing filaments on a mandrel, wet lay up of fiber fabric, use of what is known as "pre-preg" fibers or fabric which have been impregnated with a resin matrix some time prior to use, etc. All these methods and materials are referred to as "fiber reinforced".

When items made of reinforced composites, and especially of high strength carbon or graphite fibers, are impacted at low energies and velocities, such as from handling bumps incurred during shipment, storage and assembly of the items as well as inadvertent impacts resulting from dropping of tools, or other articles on the items, little, if any, damage is visible on the impacted surfaces. However, shock waves traveling through the laminate structure produce significant discontinuities or defects within the thickness of the composite structure. Such damage reduces the strength of the composite article, and, unfortunately, the resulting damage is very difficult to discover when using conventional quality control methods.

Heretofore, there has been no inexpensive, reliable means for ascertaining possible damage due to low energy, low velocity impact on the composite structure without resorting to costly nondestructive testing of the entire article. Higher energy impacts can be discerned because of the surface damage and deformation which occurs. But, because of the lack of any visual indication of a low energy, low velocity impact, resort must be made to costly nondestructive testing of each and every item to determine if serious damage to the subsurface of the article may have occurred due to such low energy impacts. Because of the difficulty in determining possible damage from unintentional impacts which themselves may not be recognized as being harmful, it has been the practice to overdesign the system to offset any possible damage from such impacts. This partially alleviates the high costs required if all items were individually subjected to nondestructive testing, but the overdesign is itself costly, and there is still left a question as to the integrity of items which are not individually subjected to nondestructive testing.

A principal objective of the present invention is to provide a fiber reinforced composite structure in which damage caused by low energy, low velocity impacts of the surface of the structure can be readily detected.

It is also an objective of the invention to provide a process of fabricating articles of carbon, graphite, glass or like fiber reinforced composite material in which the article has a high strength to weight ratio and in which visual inspection of an article which has been subjected to a low energy, low velocity impact of the surface will reveal the damage.

SUMMARY OF THE INVENTION

The above and other objectives are achieved in accordance with the present invention by a novel structure and a novel method of fabricating such structure comprising a fiber reinforced composite article in which a distinct, relatively thin, outer layer of laminated filamentary material is provided on the surface of the composite article. The method comprises the steps of forming the composite article by laying up multiple layers of a first filamentary material to form an unbonded base structure which essentially has the shape and size of the desired composite article. The first filamentary material in the base structure is impregnated with a curable polymeric resin to essentially saturate the base structure with the resin. The resin is cured to bond the first filamentary material of the base structure to form the desired composite article. The improvement of the present invention involves providing the article with an additional, outer layer of a relatively thin translucent composite material, and adhering ply to the surface of the base structure such that the visible surface of the outer layer is uniform and consistent in color. The thickness of the outer layer is relatively thin as compared to the thickness of the layers of the first filamentary material. Further, the second filamentary material has a modulus of elasticity which is different from the modulus of elasticity of the first filamentary material. The outer layer is adhered to the surface of the first filamentary material in the base structure by saturating the second filamentary material with a curable polymeric resin which when cured makes a bond with the surface of the base structure.

Preferably, the second filamentary material and the curable polymeric resin used to saturate it are chosen so that it will be relatively translucent when the resin is cured. The translucent nature of the outer layer allows the color of the layers of first filamentary material in the base structure to appear uniformly through the outer layer.

Because of the relative thinness of the outer layer and the difference in the modulus of elasticity of the first and second filamentary materials, a delamination occurs in the outer layer and between the outer layer and the surface of the base structure when the article is impacted by another object under relatively mild impact conditions, i.e., low energy and low velocity. The delamination occurring in the outer layer results from disbonding of the second filamentary material and the resin matrix and the separation of the outer layer from the surface of the first filamentary material in the base structure. The delamination alters the optical qualities of the outer layer and causes a discoloration to appear at the area of the delamination. The discoloration is further enhanced by reason of debonding of the fibers in the outer layer from their matrix. Generally, the discoloration is a whitening of the affected area which is contrasted with the uniform darker color of the remainder of the article. The translucence of the outer layer enhances the contrast between the whitened area and the surrounding darker area of the remainder of the article.

Additional objects and features of the present invention will become apparent from the following detailed description, taken together with the accompanying drawing.

THE DRAWINGS

Preferred embodiments of apparatus for carrying out the method of the present invention and of a product of the method, representing the best modes presently contemplated of carrying out the invention, are illustrated in the accompanying drawing which is an enlarged, pictorial, sectional view of a sidewall portion of a fiber reinforced composite article made in accordance with the invention.

DETAILED DESCRIPTION OF THE PREFERRED EMBODIMENTS

As stated previously, the present invention in its broad aspect provides a structure and method of producing the structure of a fiber reinforced composite article in which the surface of the article is capable of generating a visible indication thereon upon impact of the surface by a foreign object. In most applications of fiber reinforced composite articles, the utility of the article resides in its high strength to weight ratio and other subsidiary considerations such as the durability of the article. The method of the present invention is most advantageously utilized when making such high strength, generally lightweight articles Such articles are commonly made of filamentary material such as carbon or graphite fibers held in a matrix comprising an epoxy resin. The following description of a preferred method in accordance with the present invention and of the article made by the method will be directed to reinforced composites made of carbon or graphite fibers. However, it is to be understood that the invention is not to be restricted in any sense to such composites or to filament wound articles only. The scope of the invention is fully set forth in the accompanying claims.

It is known that impact of fiber reinforced items with other objects can cause internal delamination and damage to the fiber reinforced composite which can greatly impede the strength of the items. Visible indication of high energy impact of the fiber reinforced composite article is readily made inasmuch as visible damage is caused on the surface of the item. However, impacts at lower energy are not so easily discernable. As used throughout this disclosure, low energy impacts are defined as impacts having energy levels of between about 5 and 40 joules. This is equivalent to an impact resulting from dropping a 2 inch diameter steel ball from a height of between about 98 and 750 centimeters. The low energy impacts do not produce visible indication or damage at the surface of the article. Yet, such low energy impacts can and often do cause serious subsurface damage to the composite article. This problem is especially acute when the articles are made with carbon or graphite fibers. Methods of filament winding pressure vessels, motor casings, drive shafts, etc. are well known and will not be described in detail here. Generally, a mandrel is provided upon which the filament wound item is to be formed. Winding starts at one end of the mandrel and continues along the mandrel to the other end. The windings can be helical, hoop or a combination of helical and hoop windings as is well known and customary in the art. Layers of superimposed windings of filaments are produced by winding back and forth along the length of the mandrel until the desired thickness of filament windings are achieved. Generally, the thickness of the filament windings of an article will be within the range of about 0.25 centimeter and 1.3 centimeters. The filaments of these windings are referred to throughout the present disclosure and claims as the first filamentary material to distinguish them from the subsequent windings of an outer layer which is applied to the article in accordance with this invention. The article formed from the windings of the first filamentary material is also referred to as the base structure to again distinguish such structure from the outer layer. When wound to its proper thickness, the base structure has essentially the shape and size of the desired composite article which is being produced.

Suitable high strength filaments to be used as the first filamentary material include glass, aramid, graphite, carbon, nylon and boron, to name a few. For high strength articles such as drive shafts, the preferred filaments are carbon or graphite. The layers of first filamentary material are saturated with a curable polymeric resin. When making high strength articles such as drive shafts, it is preferable to use an epoxy polymer as the curable polymeric resin. The layers of first filamentary material may be impregnated with the curable resin after the winding of each layer or few layers of filaments. Preferably, however, the strands or rovings of filaments are resin impregnated by passing through a resin bath just prior to being wound on the article, as is well known in the art.

The present invention involves the novel steps of forming a relatively thin layer of a translucent outer composite material and adhering the relatively thin outer layer to the surface of the base structure.

In accordance with the present invention, following the laying up of the multiple layers of first filamentary material to form the base structure, and the impregnation of the layers of first filamentary material with the curable resin, a relatively thin layer of a second filamentary material is layed up on the surface of the layers of the first filamentary material, i.e., on the surface of the base structure.

The material from which the fibers of the second filamentary material is made is preferably chosen so that the fibers have a modulus of elasticity which is different from the modulus of elasticity of the first filamentary material. A ratio of at least two (2) in the modulus of elasticity between the first and second filamentary material is desirable.

In accordance with a preferred aspect of the invention wherein carbon or graphite fibers are used as the first filamentary material, the outer layer is preferably fabricated from a composite which is translucent. Applicable material for the fibers of the outer layer are glass, nylon and other polymers. The resins can be clear or transluscent epoxy, polyester or other clear polymers.

Winding of the outer layer is accomplished by utilizing one or more strands or rovings of the filamentary material, and winding the material on the base structure. Winding begins at one end of the base structure and continues to the other end. The windings can be helical, hoop or a combination of helical and hoop, but it is preferred to utilize hoop windings for cylindrical shapes. Several plies of superimposed windings of the outer layer filaments are produced by winding back and forth along the length of the base structure, i.e., the drive shaft 12 as shown in FIG. 1. Winding is continued until the desired thickness of filament in the outer layer are achieved. Preferably, plies of the second filamentary material are layed up in the outer layer to a thickness of between about 4 mils and 20 mils.

The plies of second filamentary material in the outer layer is saturated with a curable resin, and as mentioned previously, the resin is preferably of the type which is generally clear or translucent when cured. The layers of second filamentary material can be impregnated with the curable resin following the winding of the filaments on the base structure, or in a preferred mode of operation, the strands or rovings of the second filamentary material are impregnated by passing them through a resin bath just prior to being wound on the base structure.

In the drawing, there is shown an enlarged, pictorial, section view of a sidewall portion of a fiber reinforced composite article made in accordance with the present invention The base structure is shown by the reference number 20. The base structure comprises the composite formed of the first filamentary material. As shown, the outer layer 22 is relatively thin as compared to the thickness of the base structure 20. The outer layer 22 is bonded directly to the surface of the base structure 20.

Because of the relative thinness, the outer layer 22 is not relied on in any manner to provide strength to the completed article. The sole purpose of the outer layer 22 is to act as a means for giving a visual indication when the surface of the article is impacted by another object under low energy, low velocity conditions.

The resins in both the base structure and the outer layer are, of course, cured to complete the fabrication of the composite article. Curing of the resin in the outer layer bonds the plies of second filamentary material to the plies of the first filamentary material in the base structure. The resin in the first filamentary material can be cured prior to laying up the second filamentary material or alternatively, the second filamentary material can be layed up on the base structure prior to curing of the resin in the base structure. In the latter mode, the resin in the first filamentary material and the resin in the second filamentary material are cured at the same time.

It has been found to be advantageous to apply a release agent to the surface of the resin impregnated filamentary material of the base structure prior to the winding of the second filamentary material on the base structure. The release agent can be any of the well known agents used in the art of fabricating fiber reinforced composites. The release agent is used to selectively impair the bonding of the outer layer to the base structure and to impair the bonding of the outer layer fibers to the resin matrix. This bond can be adjusted as desired by using different release agents and varying the amounts of release agent which is used. The bond within the outer layer and between the outer layer and the base structure can be selectively engineered such that the fiber-matrix in the outer layer will disbond and the outer layer will readily separate from the base structure all when the outer layer is impacted by another object. A suitable release agent for the impact layer would be Frekote 33 or 44 and any sprayable high temperature release agent.

In accordance with the present invention impact is indicated by a visibly observable, whitened area on the surface of the outer layer. The whitening is caused by fiber-matrix disbonding in the outer layer as well as separation or disbonding of the outer layer from the reinforced composite material in the underlying base structure. The translucent nature of the outer layer in the preferred embodiment of the invention augments the contrast between the whitening in the outer layer and the darker color of the base structure which is seen through the translucent outer layer.

The visible damage occurring in the outer layer of the composite articles produced in accordance with the present invention makes it easy to discern possible areas of impact damage. Only those articles showing such visible indications of impact need to be tested for loss of strength, and only those isolated areas showing the visible indications need be subjected to testing. The articles thus need not be overdesigned.

It is to be understood that the present disclosure, including the detailed description of the preferred embodiments, is made by way of example and that various other embodiments are possible without departing from the subject matter coming within the scope of the following claims, which subject matter is regarded as the invention.

I claim:

1. A fiber reinforced composite article comprising a base structure composed of a first filamentary material which is saturated with polymeric resin, said base structure having a thickness of between about 0.25 centimeter and 1.3 centimeters, and a layer of second filamentary material which is wound over the base structure and saturated with polymeric resin, said layer having a thickness of between about 4 mils and 20 mils, with said second filamentary material having a sufficiently different modules of elasticity from the modulus of elasticity of said first filamentary material so that the modulus of elasticity of one of the filamentary materials is at least about twice that of the other filamentary material.

2. An article as in claim wherein the modulus of elasticity of the second filamentary material is lower than that of the first filamentary material.

3. An article as in claim 1 wherein said first material is graphite and wherein said second material is fiber glass.

4. An article as in claim 1 wherein said second material and polymeric resin with which said second material is saturated are translucent.

5. A fiber reinforced composite article comprising a base structure composed of fiber reinforced first material, a layer of second filamentary material wound over the base structure and saturated with polymeric resin, said layer of second filamentary material being thinner than the base structure, with the second filamentary material having a different modulus of elasticity from the modulus of elasticity of said first filamentary material, and an agent disposed between the base structure and said layer of second filamentary material to impede bonding of the second filamentary material to the base structure.

6. An article as in claim 5 wherein said agent is also disposed on the second filamentary material to facilitate fiber-matrix disbonding within the layer of second material upon impact of the surface thereof with a foreign object.

* * * * *